March 15, 1960     J. J. G. G. BROIDO     2,928,315
MOTION PICTURE CAMERA

Filed May 31, 1955     2 Sheets-Sheet 1

Inventor
Jacques, Jean, Georges, Gaston Broido

By Henry K. Feit
Attorney

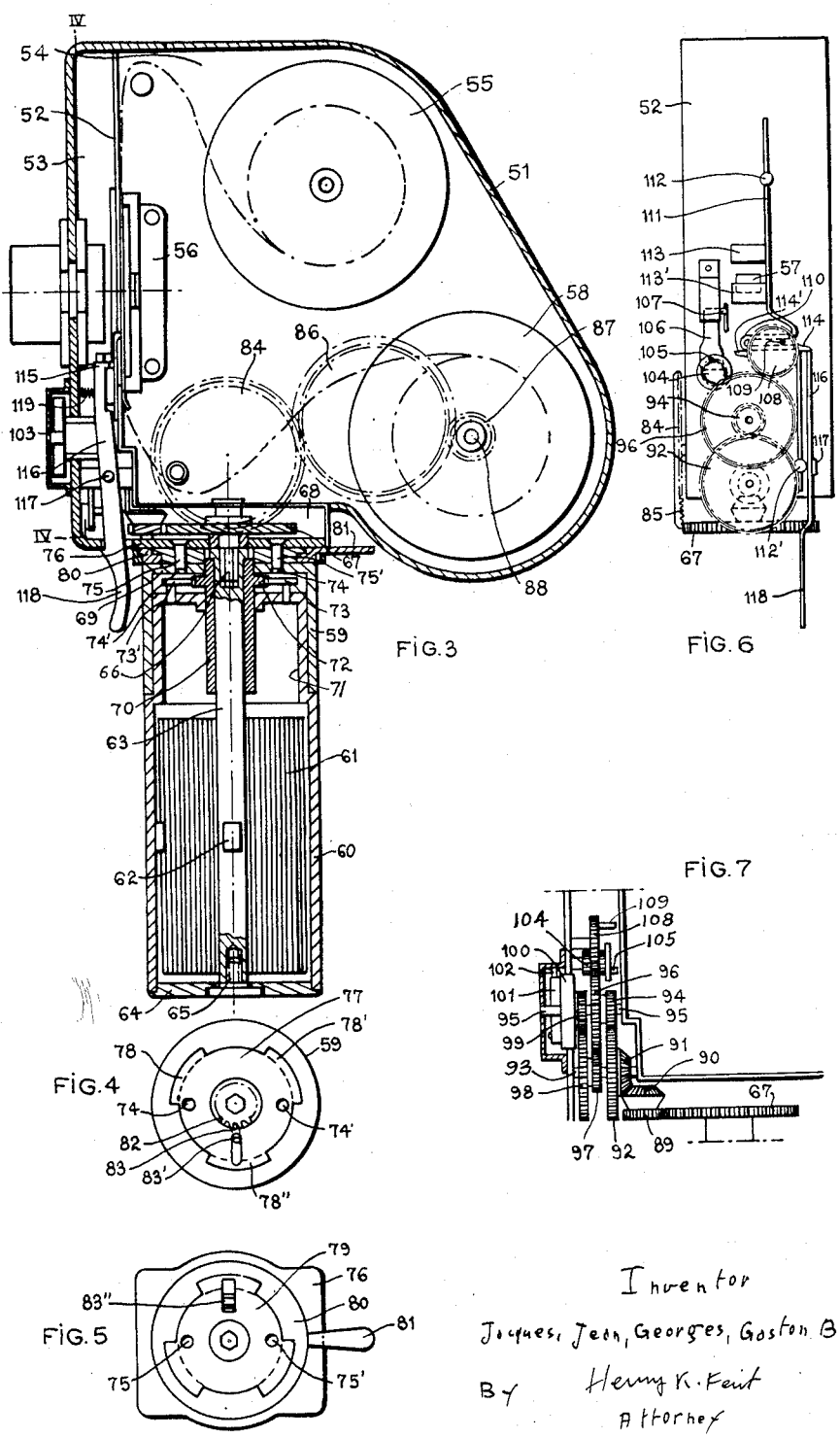

United States Patent Office 2,928,315
Patented Mar. 15, 1960

2,928,315
MOTION PICTURE CAMERA

Jacques Jean Georges Gaston Broido, Nogent-sur-Marne, France, assignor to Cinematic Anstalt Company, Vaduz, Liechtenstein Application May 31, 1955, Serial No. 512,258

Claims priority, application France June 4, 1954

8 Claims. (Cl. 88—17)

The present invention relates to a motion picture camera and aims particularly at providing an amateur camera for films of reduced size (8 mm., 9, 5 mm. and 16 mm.), which have a reduced bulkiness and are easy to handle. Cameras of this type have usually rather large sizes, either in the width when the driving mechanism and the two film rolls (or the feeder) are housed in superimposed compartments; or in the length, when the driving mechanism is housed at the rear.

The camera according to the present invention is characterized in that it is constituted by a case fixed by its base on a handle in which is housed the driving mechanism.

Thanks to this arrangement, the width of the case is practically reduced to the space necessary to house the film rolls, and the space necessary for the driving devices of the film (passage-way, pressing device and drive dog) and the shutter.

According to a preferred embodiment of the invention, the handle containing the whole of the driving device is removable, the motor driving a vertical shaft with a vertical shaft housed in the case and actuating the movable members in this case. With this arrangement, the same driving handle can be used to drive several cameras of different sizes, thus reducing quite appreciably the cost of the cameras for a buyer wishing to use several cameras of different sizes.

The release device of the motor is made in the shape of a trigger disposed on the front face of the handle. The camera can be held and actuated with one hand, exactly like a weapon and as the upper part of the camera is entirely cleared of all the accessories, a horizontal view finder can be mounted on it with its optical axis in the same vertical plane as the lens, suppressing thereby the lateral parallax.

By way of example, two forms of a camera according to the invention are described hereafter and illustrated in the annexed drawing.

Figure 3 is an enlarged longitudinal vertical section of another embodiment of the camera containing the driving apparatus.

Figure 4 is a top plan view of the disassembled handle of the apparatus illustrated in Figure 3.

Figure 5 is a plan view seen from underneath of the fixing device for the handle on the base of the camera.

Figures 6 and 7, respectively, illustrate, in front elevation and in side elevation, the driving mechanism for the movable members of the camera.

Figure 1:
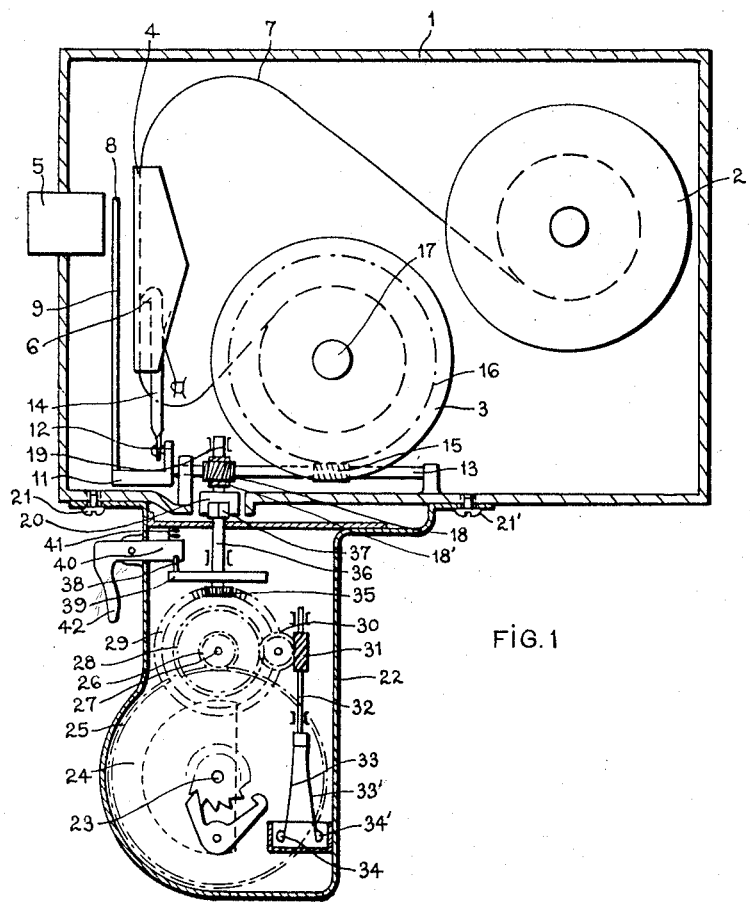
Figure 1 is a longitudinal elevation section of a first form of embodiment of the camera.
Figure 2:
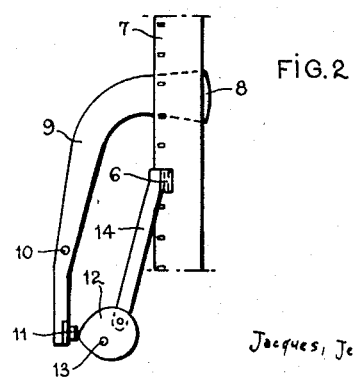
Figure 2 is a fragmentary front view showing the drive-dog and the shutter.

As shown in Figure 1, the camera according to the invention is constituted by a case 1 housing at the rear the feeding film roll 2 of the unexposed film and the receiving film roll 3 and, at the front, the passage-way 4, the lens 5, the drive-dog 6 of the film 7 and the shutter 8 supported by a lever 9 pivoted at 10 and cranked at its lower end 11, said end being actuated by an eccentric 12 keyed on the horizontal longitudinal shaft 13 journaled in the lower part of the camera and actuating also by means of the small rod 14 the drive dog 6 (Figure 2).

The shaft 13 drives also, for instance, through a worm-screw 15, a pinion 16 set on the axis 17 of the receiving roll 3, but other drive means may, of course, be used.

The horizontal driving shaft 13 is actuated, through the helical pinion 18, 18', by a vertical shaft 19 bearing at its lower end a socket 20, the bore of which is square in cross section.

On the lower face of the camera is fixed, as by two screws 21, 21', a handle constituted by a flat casing 22 inside which a spring driven motor is mounted on an axis 23 and a drum 24 of the spring driven motor bears external teeth 25 meshing with a pinion 26 keyed on a transverse shaft 27. The shaft 27 bears two other pinions 28 and 29. The pinion 28 drives, through a small intermediate pinion 30 a worm screw 31 mounted on the central shaft 32 having at its end a centrifugal governor constituted by the spring blades 33, 33' upon which are fixed small masses, 34, 34'. The second pinion 29, which is, for instance, a bevel pinion, meshes with a small pinion 35 keyed upon a vertical shaft 36 which ends in a square 37 meshing with the square bored in the socket 20; the driving shaft 19 of the camera, the set of pinions forming the step-up gearing producing the necessary speed of rotation.

On the vertical shaft 36 is mounted a plate 39 bearing a ratchet 38 meshing with a locking lever 40, provided with a spring 41, actuated by the trigger 42 so that, when one presses upon this trigger, the motor is released the pawl 39 is cleared from the locking lever 40 and the motor is started.

The motor is wound up with a key (not shown) mounted, on a side face of the handle 22, on the axis 23 of the drum and is preferably provided with a grip which can be folded back in a suitable recess provided for in the face of the handle.

Thus, the camera according to the invention can be conveniently held with one hand, one finger controlling the starting or the stopping of the motor, while the other hand is free to focus the lens, to work the diaphragm and to carry out the other required operations.

The view finder, not shown, can be placed upon the upper face of the camera and can be of any suitable type.

Of course, instead of the standard spring driven motor shown in Figure 1, it is possible to use a small electric motor fed by a battery also housed in the handle or a motor actuated by a rubber spring like the motors used for some toys. In special cases, it may be advantageous to house only the motor in the handle, the rest of the mechanism (gear and governor) being mounted in the camera, according to the space available in the camera.

Figures 3 to 7 illustrate another embodiment of the camera equipped with a motor in the handle wherein the axis of the motor is vertical and the drum is constituted by a rotatable portion of the handle. The spring, the ends of which are fixed to the rotatable handle and to the main shaft has preferably a large width equal to the height of the rotatable portion of the handle, supplying thereby a remarkably constant speed on nearly the entire run of the expanding spring.

As shown in the drawing, the camera is constituted by an exceedingly flat case 51, divided by a transverse partition 52 in two compartments: the front compartment 53 containing the driving mechanism, described hereafter and the rear compartment 54 containing the feeding roll 55, the passage-way provided with a pressing-device 56 through which the film passes in front of the aperture 57 for the taking of photographs, and, finally, the receiving roll 58 upon which is wound up the exposed film.

Upon the base of the camera is mounted a cylindrical handle having a diameter substantially equal to the width of the case, as can be seen in Figs. 3 and 6. The upper portion 59 of this handle is removably fixed to the camera and the lower portion 60 can rotate in relation to the upper portion and forms the drum of a motor constituted by a wide spiral spring 61, fixed, on the outside, on the rotatable handle 60 and, on the inside, by means of a pin 62, on the main shaft 63. Shaft 63 is freely journaled in the bottom 64 of the handle 60 which is axially held in position by a head screw 65 screwed in the lower end of the shaft 63. A six-sided bore in the upper end of the shaft 63, receives the end of a corresponding vertical shaft 66 extending from the case of the camera and bearing, inside the camera a main control pinion 67 housed in a small lower compartment 68.

The stationary portion 59 of the handle includes an upper wall portion 69 upon which is fixed a central tube 70 entering the upper part 71 of the rotatable portion 60 of the handle and serving to centre the shaft 63. The tube 70 bears a ratchet 72 meshing with the pawls 73, 73' hinged on the bottom of the upper part 71 of the rotating portion 60 so as to allow this handle to rotate only in the direction to wind up the spring 61.

In the upper wall portion 69 of the stationary portion 59 of the handle are made two bores 74, 74' in which can enter, when the handle is placed in position, two teats 75, 75' fixed on the plate 76 forming the base of the case of the camera (Figs. 3, 4, 5). The upper wall portion 69 bears, in addition, a disc 77 having three wide teeth 78, 78', 78" to engage an aperture of corresponding shape 79 provided for in a locking ring 80: the ring 80 can rotate when the lever 81 actuates the base plate 76 and the whole assembly forms a bayonet device to fix the handle on the base plate. To prevent a sudden slackening of the spring 61 when the handle is removed and the spring is taut, the shaft 63 bears at its upper end, on a level with the bayonet disk 77, a ratchet 82 in which can enter a radially sliding finger 83 having a teat 83' to engage an inverted channel piece 83" which is moved radially, as by a slope when the locking ring 80 is rotated by the lever 81: thus, the unlocking of the handle 59—60 secures automatically the locking of the shaft 63 of the motor in relation to the handle 59—60 and prevents the slackening of the spring 61.

Of course, the handle 59—60 can be fixed permanently on the camera instead of being removable.

The operation of the camera, by means of the main pinion 67, is as follows:

The main pinion 67 (Figs. 3 and 6) drives a laterally toothed wheel 84, mounted on a horizontal axis and bearing for instance teeth on a circular folded flange 85 and the wheel 84 drives a wheel 86 meshing with a pinion 87 keyed on the axis 88 of the receiving roll 58.

On the other hand, the main pinion 67 meshes (Figs. 6 and 7) with a small pinion 89 having a vertical axis integral with a bevel pinion 90 which meshes with a pinion 91 which is integral with a spur toothed wheel 92 and both are loosely mounted on an horizontal axis 93 arranged in the front compartment 53 of the camera. The wheel 92 meshes with a pinion 94, loosely mounted on an axis 95 parallel to the axis 93. Pinion 94 is integral with a wheel 96 meshing with a pinion 97 integral with a wheel 98: both pinion 97 and wheel 98 are loosely mounted on the first axis 93 and the wheel 98 meshes with a pinion 99 loosely mounted on the second axis 95. This set of pinions constitutes a step-up gear, the last pinion 99 of which controls the centrifugal governor constituted by a disk 100 loosely mounted on the axis 95 and integral with the pinion 99; the disk 100 bears hinged eccentric arms, such as 101, provided with friction pieces 102; the centrifugal force presses these friction pieces against the inner wall of a small cylindrical case 103 housing the governor and fixed upon the front wall of the camera.

The toothed wheel 96 in the gear train above described drives, on the one hand, a pinion 104 which operates by means of a teat 105 the eccentric 106 which actuates the drive dog 107 of the film and, on the other hand, a pinion 108 operating the shutter by means of a teat 109 engaging a horizontal slide 110 supported by a stem 111 vertically guided in 112, 112'. The shutter is constituted by two blades 113, 113' fixed on the stem and alternately obturating the exposure aperture 57. The pinion 108 bears also two diametrically opposed stops 114, 114', and in the position of rest, the nose 115 of a locking lever 116 (Figures 3 and 6) engages one of these stops. The lever 116 is hinged in 117 and can be operated through its lower end 118, forming a trigger. A draw-back spring 119 tends to keep this lever in the locking position. The arrangement of the two stops 114, 114' allows the locking of the mechanism in the position corresponding to the obturation of the aperture 57 by either one of the blades 113, 113' and thus allows taking photographs in succession.

What I claim is:

1. Motion picture camera including a case having a relatively narrow width and containing the film rolls, an exposure aperture, a mechanism including a film drive dog and a shutter for this aperture, a rod-like handle having a width comparable to the width of the case and fixed on the lower face of the case—of sufficient elongation to extend across the palm of the hand—and including an upper stationary portion and a lower portion, rotatably mounted in relation to the stationary portion, a spring driven motor with a vertical shaft housed inside the handle, the drum of said motor being constituted by the lower rotating portion of the handle, means to drive through this motor the mechanism contained in the case without rotating said rotating portion of said handle, means to wind up the motor by rotating the rotatable portion of the handle and means to start said motor mounted adjacent the upper stationary portion of the handle.

2. Motion picture camera including a narrow case containing the film rolls, an exposure aperture, a mechanism including a film drive dog and a shutter for the aperture, a rod-like handle having a width substantially equal to the width of the case and fixed on the lower face of the case and elongated in a direction perpendicular to the lower face of said case and of sufficient elongation to be grasped by wrapping the fingers of the hand therearound and including an upper stationary portion and a lower portion, rotatably mounted in relation to the stationary portion, a motor constituted by a wide coil spring housed in the handle and having a width about equal to the height of the rotatable portion of the handle to which it is fixed by its outer end, a vertical shaft, coaxial with the handle, freely journaled in said handle and to which is fixed the inner end of said spring, a ratchet device between the rotatable portion and the stationary portion of the handle to allow said rotatable portion to turn only in the direction of the winding-up of the spring, means to drive, through said vertical shaft of the motor, the mechanism contained in the case, means to lock said mechanism including trigger means for releasing the motor disposed adjacent the upper stationary portion of the handle.

3. Motion picture camera including a case containing the film rolls, an exposure aperture, a mechanism including a film drive dog and a shutter for said aperture, a cylindrical removable handle elongated in a direction perpendicular to the lower face of said housing and of sufficient elongation to be grasped by wrapping the fingers of the hand therearound, said handle including an upper portion provided with a bayonet device to fix it on the lower face of the case and a rotatable lower portion, a motor constituted by a wide coil spring housed in the handle and having a width about equal to the height of the rotatable portion of the handle to which it is fixed by its outer end, a vertical shaft, coaxial with the handle, freely journaled in said handle and to which is fixed the inner end of said spring, a ratchet device between the rotatable portion and the stationary portion of the handle to allow said rotatable portion to turn only in the direction of the winding-up of the spring, means to drive, through said vertical shaft of the motor, the mechanism contained in the case, means to lock said mechanism including a trigger connected to said mechanism and depending therefrom to a location adjacent the front face of the upper stationary portion of the handle, means to immobilize the vertical drive shaft in relation to the stationary portion of the handle, locking means for the bayonet clamping device fixing the handle on the case and means to actuate said immobilizing means of the drive shaft by release of the bayonet clamping device.

4. Motion picture camera including a case containing the film rolls, an exposure aperture, a mechanism including a film drive dog and a shutter for this aperture, a rod-like handle fixed on the lower face of the case and elongated in a direction perpendicular to the lower face of said case and of sufficient elongation to be grasped by wrapping the fingers of the hand therearound and including an upper stationary portion and a lower portion, rotatably mounted in relation to the stationary portion, a motor constituted by a wide coil spring housed in the handle and having a width about equal to the height of the rotatable portion of the handle to which it is fixed by its outer end, a vertical shaft, coaxial with the handle, freely journaled in said handle and to which is fixed the inner end of said spring, a ratchet device between the rotatable portion and the stationary portion of the handle to allow said rotatable portion to turn only in the direction of the winding-up of the spring, means to drive, through said vertical shaft of the motor, the mechanism contained in the case, means to lock said mechanism including a trigger disposed on the casing adjacent the upper stationary portion of the handle.

5. Motion picture camera constituted by a flat case provided with an inner transverse vertical partition dividing the case into a rear compartment in which are mounted two transverse axes to receive the feeding roll and the receiving roll for the exposed film, means to lead the film in front of this aperture, a lens fixed in the front wall of the case in front said aperture, and in a front compartment containing a mechanism including a drive dog for the film, a shutter for the exposure aperture, a step-up gear to drive these three elements, said gear including a first horizontal drive pinion set in the lower portion of the case and a vertical shaft upon which is mounted said pinion and which extends downwards outside the case, in the rear compartment of the case a set of pinions with horizontal axes to drive the axis of the receiving roll by means of said horizontal drive pinion, a rod-like cylindrical handle fixed on the lower face of the case elongated in a direction perpendicular to the lower face of said case and of sufficient elongation to be grasped by wrapping the fingers of the hand therearound and arranged coaxially to the vertical shaft extending outside said case and including an upper stationary portion and a lower portion rotatably mounted on the stationary portion, a motor within the handle constituted by a wide coil spring, the outer end of which is fixed to the rotatable portion of the handle, a vertical shaft, freely journaled in the handle, coaxially to said handle and to which is fixed the inner end of the spring, coupling means between the shaft of the spring driven motor and the vertical drive shaft extending outside the case, ratchet means between the rotatable portion of the handle and the stationary portion to allow the rotatable portion to be driven only in the direction of the winding up of the spring, means to lock the mechanism of the camera and the motor and including a trigger mounted on the casing near the stationary portion of the handle.

6. A motion picture camera comprising a housing for containing film rolls and being provided with an exposure aperture, a camera operating mechanism including film driving means and a shutter to periodically close said aperture, rod like handle means to hold and position said camera depending from and elongated in a direction perpendicular to the lower face of said housing and of sufficient elongation to be grasped by wrapping the fingers of the hand therearound, a vertical shaft rotatably mounted inside said handle means, coupling means between said shaft and said mechanism, a spring motor arranged inside said handle means and operatively connected with said shaft, said handle means including a rotatable member coaxial with respect to said shaft and connected to said spring means to enable the winding up thereof, means to hold said handle against rotation in respect to said housing during unwinding of said spring, and trigger means disposed adjacent the upper portion of the handle means for starting and stopping said spring motor.

7. Motion picture camera comprising a housing for containing the film rolls and provided with an exposure aperture, a mechanism including film driving means and a shutter to periodically close said aperture, rod-like handle means to hold and position said camera depending from the lower face of said housing and elongated in a direction perpendicular to the lower face of said housing and of sufficient elongation to be grasped by wrapping the fingers of the hand therearound, a vertical shaft rotatably mounted inside said handle means, coupling means between said shaft and said mechanism, said handle means comprising an upper stationary part and a lower part rotatably mounted upon the first coaxially to said vertical shaft, a spring motor located inside said handle means and operatively connected to said vertical shaft and to the rotatable lower part of the handle, whereby said spring may be wound up through the rotation of said rotatable part of the handle means, means to hold the lower part of said handle stationary in respect to said housing driving mechanism of said spring and trigger means disposed adjacent the upper portion of the handle means for starting and stopping the rotation of said shaft by said spring motor.

8. Motion picture camera comprising a housing for containing the film rolls and provided with an exposure aperture, a mechanism including film driving means and a shutter to periodically close said aperture, rod-like handle means to hold and position said camera depending from the lower face of said housing and elongated in a direction perpendicular to the lower face of said housing and of sufficient elongation to be grasped by wrapping the fingers of the hand therearound, a vertical shaft rotatably mounted inside said handle means, coupling means between said shaft and said mechanism, a spiral spring arranged inside said handle means coaxially to said shaft and having its inner end fixed thereto, an annular member rotatably mounted upon said handle means and to which the outer end of said spiral spring is connected to enable the winding up of said spring through rotation of said annular member, means to prevent rotation of said handle in respect to said housing driving mechanism of said spring, and trigger means disposed adjacent the upper portion of the handle means for starting and stopping the rotation of said shaft by said spiral spring.

References Cited in the file of this patent

UNITED STATES PATENTS

| | | |
|---|---|---|
| 908,091 | Groff | Dec. 29, 1908 |
| 1,295,081 | Tartara | Feb. 18, 1919 |
| 1,691,419 | Willard | Nov. 13, 1928 |
| 1,949,339 | Thomas | Feb. 27, 1934 |
| 2,013,288 | Porter | Sept. 3, 1935 |
| 2,113,182 | Scheibell | Apr. 5, 1938 |
| 2,166,147 | Heinisch et al. | July 18, 1939 |
| 2,174,155 | Githens | Sept. 26, 1939 |
| 2,174,529 | Proctor | Oct. 3, 1939 |
| 2,472,823 | Harlow | June 14, 1949 |

FOREIGN PATENTS

| | | |
|---|---|---|
| 271,416 | Great Britain | Feb. 16, 1928 |
| 349,526 | Great Britain | May 20, 1931 |